April 4, 1939.  B. A. JEFFERY  2,152,738
METHOD OF AND APPARATUS FOR MOLDING MATERIALS
Filed April 17, 1936
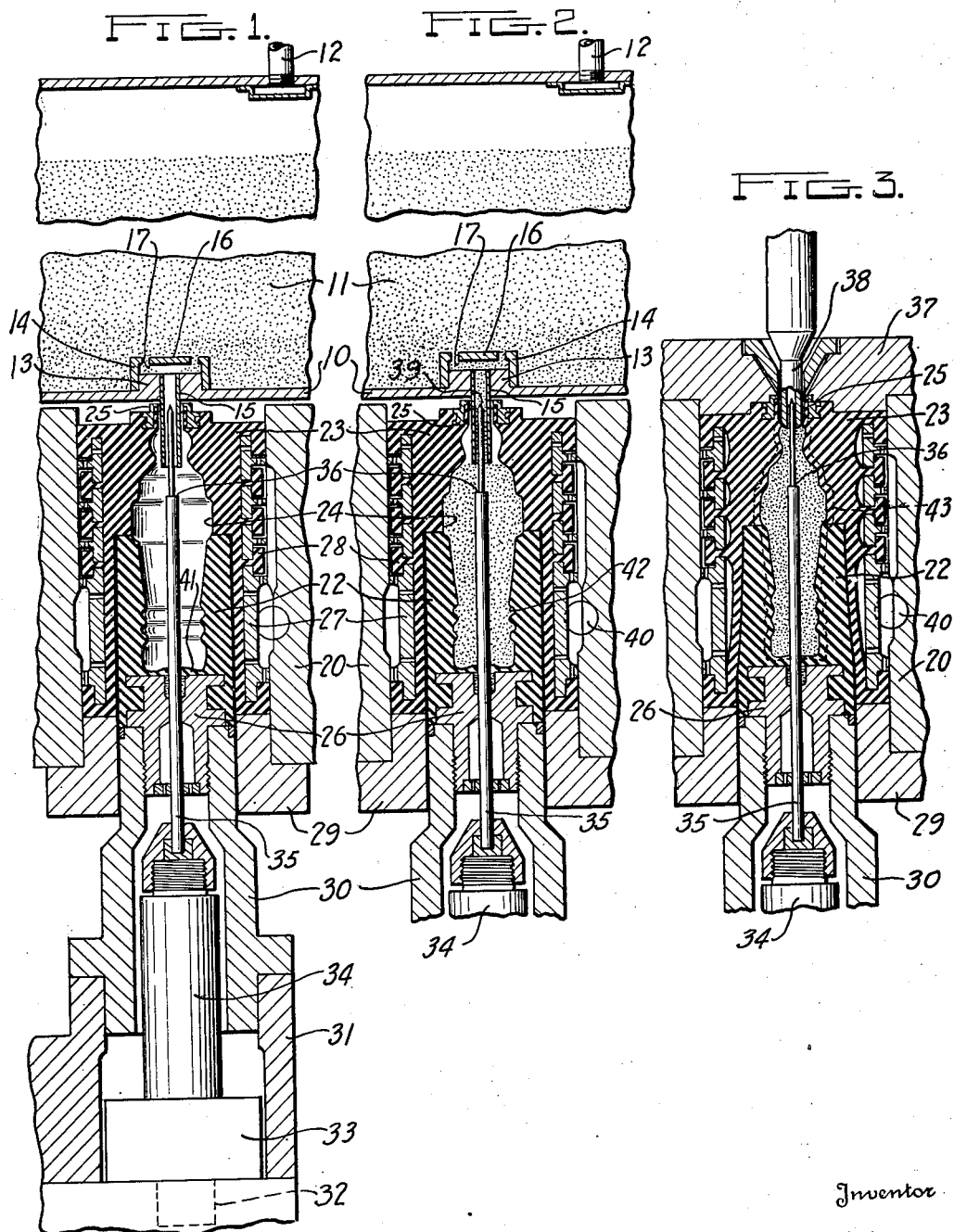
Inventor
Benjamin A. Jeffery
By Owen & Owen
Attorneys

Patented Apr. 4, 1939

2,152,738

UNITED STATES PATENT OFFICE 2,152,738

METHOD OF AND APPARATUS FOR MOLDING MATERIALS

Benjamin A. Jeffery, Detroit, Mich., assignor, by mesne assignments, to Champion Spark Plug Company, Toledo, Ohio, a corporation of Delaware (1938)

Application April 17, 1936, Serial No. 74,972

11 Claims. (Cl. 25—45)

This invention relates to a method of and apparatus for molding material, particularly powdered and granular materials which are substantially non-plastic.

The object of the invention is to provide an apparatus and method whereby powdered material may be filled into a cavity of predetermined shape and then pressed by approximately equal pressure in all directions sufficiently to form a sustaining shape, and then the pressure may be released without rupturing the formed shape.

Many of the essential features of the method and apparatus disclosed and claimed herein were disclosed but not claimed in my copending application for "Preparing and molding material", Serial No. 16,601, filed April 16, 1935, which was a continuation in part of my prior application for "Molding spray dried material", Serial No. 591,531, filed February 8, 1932, and which also disclosed said features of the method and apparatus. As to these features, this is a continuation in part of said prior applications.

Some forms of ceramic insulating members and similar articles and materials have been formed by compressing substantially non-plastic, dry powder under heavy pressure into self-sustaining shapes that could be rendered sufficiently strong by firing. In pressing such material in a rigid mold the friction of the material on the mold walls, unequal depths of different portions of the mold cavity in the line of compressive movement, and internal friction of the mass being pressed prevent equal solidification of all parts of the powder. This sometimes renders it impossible to form the desired shapes, and in all cases prevents the formation of an entirely uniform article.

By exerting hydrostatic pressure upon the powder it may be compressed substantially equally at all points so that this difficulty is avoided; but a difficulty is then encountered in properly shaping the cavity into which the powder is initially introduced so that the final product will be of the desired shape.

One of the important features of the present invention is the provision of a mold having walls of deformable and elastic material, such as rubber, with walls sufficiently thick so that they will constitute a self-sustaining mold providing a cavity of desired shape, but the resistance of the mold walls to temporary deformation being slight in comparison with the high final pressures which are employed in compressing powder into shaped articles.

Another important feature of the invention is so shaping and constructing the molds with respect to the cavities therein that the release of pressure may take place without exerting rupturing strains upon the compressed powder therein.

Other details will appear as the description proceeds.

In the accompanying drawing forming a part of this specification, Figure 1 is a cross-section of one form of apparatus embodying my invention, showing the mold empty; Fig. 2 is similar to Fig. 1, but showing the mold filled; and Fig. 3 is a similar view, but showing the parts at the end of the pressing action.

In the construction shown in the drawing, there is a container 10 for powder 11. This container is made substantially air-tight and is connected by a pipe 12 with a valve, not shown, through which air under pressure may be passed into the top of the chamber and through which air may be allowed to escape from the chamber. The bottom of the container is provided with a boss 13 surrounded by a ring 14. A tube 15 projects downward through the bore of the boss. Immediately above tube 15 there is a baffle plate so that the powder must pass through a tortuous passage 17 to reach the tube.

A mold carrier 20 may be brought into operative relation with receptacle 10 so that tube 15 projects downward into the mold mounted in the carrier. In the construction shown, the mold is composed of a lower part 22 and an upper part 23. The upper part is telescoped over the lower part so that the parts will separate at the largest diameter 24 of the cavity which is shaped approximately like the spark plug core which is to be formed in the mold illustrated. A metal collar 25 is mounted in the mouth or upper mold portion 23 around the filling tube, and a metal plate 26 is embedded in the bottom portion of mold part 22. In the construction shown there is a series of perforated rings 27 surrounding the mold and engaging projections 28 from the mold.

In the form shown, the mold is held in the carrier by a support 29, normally fastened to the carrier, while the lower mold section 22 and plate 26 are mounted upon a sleeve 30 which projects upward from a member 31. A stud 32 is screw-threaded into a socket, and holds in position a block 33 which has projecting upward therefrom a stem 34 carrying a bore-forming rod 35. The upper end of rod 35 projects into tube 15, and in the form shown there is a shoulder 36 on the rod so as to form a stepped bore in the resulting core.

While only one mold and associated parts are shown, it will be readily understood that a plurality of molds may be provided in the same carrier and operated simultaneously if desired.

The mold is shown in Figs. 1 and 2 associated with a filling device. In Fig. 3 it is associated with a cover plate employed during the pressing operation. This plate comprises a member 37 held rigidly against the upper end of the mold member 23 and plate 25, and a sleeve 38 which closes the filling opening against the escape of powder, but preferably allows the escape of air. The lower end of sleeve 38 is shaped to give the desired form to the upper end of the core surrounding the bore.

The apparatus in question is particularly adapted for molding spray-dried pellets which are rounded so that they flow readily. These pellets may be of ceramic or other material which it is desired to mold. It may be understood that the filling operation would necessarily be different if ordinary powder formed from ground up materials were used, such granular powder not having the flowing characteristics of the pellets in question. However, the molding operation might be the same although the operation of filling the material into the mold would be different. When the mold is not being filled the powder will clog in the outlet, as shown in Fig. 1. When the molds are to be filled, gas under pressure is introduced above the powder through tube 12. Thereupon, pressure is exerted upon the material, urging it towards the outlet. This discharging effect is facilitated by the fact that the powder is readily permeable by gas, so that the gas passing through the powder reaches the discharge outlet and carries with it the pellets immediately adjacent the outlet, thus starting a stream of the powder into the mold. While the mold is being filled, air escapes from the upper portion of the mold around the tube, there being an escape passage left as indicated at 39 in Fig. 2.

After the mold has become filled, as indicated in Fig. 2, gas pressure is released from the receptacle, and the mold carrier and receptacle are separated. During this operation the powder remaining in the tube runs down into the mold and completes the filling of the mouth of the mold, the powder clogging beneath the baffle plate so as to prevent the discharge of material by gravity.

After the mold has been thus filled, the cover plate may be applied and fluid pressure introduced through pipe 40, from which it passes through perforated rings 27 to exert pressure upon the mold. The mold, as indicated above, is preferably made of rubber, or similar elastic material, which is thick enough to readily sustain itself against gravity and against forces normally exerted upon it by the filling operation, thus maintaining the cavity during the filling in predetermined form; but the construction is of sufficiently elastic material, such as high grade rubber, so that, when high pressure is applied to the outside of the mold, the pressure is transmitted through the walls of the mold in substantially the same manner as though they were liquid. It will be understood that while the pressure may be varied in accordance with the characteristics of different kinds of pellets, the most usual operating pressure with ceramic powder will run into thousands of pounds per square inch so that the rubber can readily be made to flow substantially as though it were a liquid. In this way the powder within the mold is compressed from all sides with a substantially equal pressure.

With some shapes of articles it may be preferable to construct the mold so that the contraction is along all cross sectional lines of the mold cavity, but in constructing spark plug cores and many other shapes it has been found sufficient to contract the cross section perpendicular to the axis without shortening the axial length of the core materially during the pressing operation. This principle may be applied generally to elongated articles. However, when the pressure is relieved, there is a tendency for the compressed article to expand slightly in all directions and, unless there is a chance for this slight expansion to take place, strain is introduced which may split the article. In the example shown, there is a thin layer 41 of rubber at the bottom of the mold cavity, and this is preferably vulcanized to member 26. When the pressure is exerted initially for compressing the article, it will be readily seen that plate 26 will largely resist the pressure and the mold cavity will maintain approximately its original length so that the initial compression acts chiefly to reduce the cross section of the article rather than its length. This results in the formation of a partially compressed article of substantially the original length of the mold cavity, but of smaller cross-section. As the pressure is continued and the resistance of the powder increases, the resistance of the mold walls to flowing is increasingly overcome so that, when the final pressure is reached, it is so small in proportion to that pressure that the rubber acts substantially like liquid. Under this final pressure, of course, the rubber flows in to thicken sheet 41 and decreases the length of the article slightly. When pressure is released the rubber flows back out, sheet 41 returning to its original thickness and providing sufficient relief for a slight expansion of the compressed article longitudinally so that strains are avoided. At the same time the movement of the walls surrounding the compressed shape is so nearly directly away from the axis that the article is released without friction tending to disrupt it. It will be readily understood that a ridge upon the article is compressed from both sides so that, when pressure is released, the mold substance contacting the sides of the ridge moves away therefrom slightly at the same time that it has an outward movement from the axis of the article. Likewise, if there is a ridge on the mold forming a groove in the article, this will thicken during compression, widening the groove, and when pressure is released the mold substance contacting the sides of the groove in the article will have a component of movement longitudinal of the axis of the article as well as away from the axis of the article, so as to recede in a direction nearly normal to the contacted surface. Member 38 is allowed to recede also simultaneously with the release of pressure.

The enlargements of the core are subjected to longitudinal contraction as well as radial contraction and for this reason the normal cavity of the mold into which the powder is filled is not only larger but of somewhat different shape than the finished article, allowance being made for the direction of contraction at each point on the surface of the article.

After the mold and powder therein has been subjected to a sufficiently high pressure to form a compact self-sustaining body, the pressure is relieved and the cover plate separated from the mold, and lower portion 22, carrying the compressed core therein, may be lowered from the upper portion 23. Thereafter the cores may be lifted from the lower portions 22. Rings 27 aid in returning the mold promptly to true circular form, as the rubber between the rings is stretched during compression, as indicated in Fig. 3, and constitutes resilient means for returning the mold to its initial shape.

The slight expansion of the pressed body upon release of pressure is sufficient to relieve pressure upon the central opening-forming spindle 35 and make possible relative longitudinal movement of the pressed body and the spindle.

In the design shown there are minor grooves 42 in the mold cavity corresponding to similar ridges on the finished core. It will be understood that these are of less depth than the distance through which the walls of the mold are moved during the compressing of the core and, therefore, when pressure is released and the molds return to normal size, the cores may be readily lifted out of portions 22. The original position of the mold walls is indicated in Fig. 3 by dotted line 43.

As previously indicated, the mold may be filled in various other ways. With powder which flows readily, such as the spray-dried pellets referred to above, they may be poured into the mold in many different ways. With powder or granular material which flows less readily, it is usually desirable to employ some kind of vacuum means to obtain proper filling. With a mold such as illustrated, if the interior of the mold is to be subjected to vacuum and pressure on the exterior of the mold during pressing operation is exerted through a liquid medium, it may be sufficient merely to close the inlet valve so that there is no ingress of fluids to the space surrounding the mold during the filling operation, this holding the mold in its expanded condition with sufficient force to withstand the vacuum necessary on the inside of the mold for filling many kinds of powder thereinto.

It will be understood also that the shape of the mold can be varied quite widely in accordance with the article which is to be formed. Also it is not necessary in all cases to form the entire mold of elastic material since with some shapes and for some purposes it is sufficient to exert the hydrostatic pressure upon only a portion of the article, one side for example. Under such circumstances a part of the mold may be of rigid material and the other part of the mold formed of elastic material. An important feature of this invention, as indicated above, is that the elastic material shall be self-sustaining against gravity and stresses normally exerted during filling, so that a cavity very closely approximating a predetermined size and shape may be provided during the filling operation, while at the same time the elastic mold walls transmit pressure during the pressing operation substantially like a fluid. By this means the advantages of a rigid mold are obtained during the filling operation and the advantages of hydrostatic pressure during the pressing operation.

With most of the powders for which this method and apparatus are intended, the bond resulting from the pressure is comparatively weak so that it will not withstand any very considerable strain. As a result, if the mold is shaped and constructed so that the movement of portions of the mold wall is at a great angle to the perpendicular to the surface which the mold wall contacts, the article will be ruptured. For example, if a mold with a cylindrical cavity is employed and it is constructed so that pressure is exerted equally both radially and axially, the mass of powder is shortened to a material degree and, when pressure is released, the mold walls in contact with the cylindrical sides of the pressed article tend to elongate axially of the cylinder and in many instances by their friction upon the surface of the pressed cylinder cause separation of the cylinder into a succession of discs. This may be avoided by constructing the mold so that the shortening of the longitudinal axis during compression is but slightly more than that necessary to take care of the normal expansion of the pressed shape when the pressure is released.

The same principles may be applied to articles of widely varying shapes, mold walls of elastic material being combined with rigid material in such ways as are necessary to regulate the direction of initial expansion of the walls in contact with the article when pressure is released so that such direction will be nearly enough perpendicular to the contacted surfaces so that rupturing friction will not be applied to said surfaces.

Wherever necessary in order to avoid rupturing friction during the release of the article, a portion of the mold wall may be made more resistant to compression, as at the thin sheet 41 in the example shown, so that it will exert comparatively little pressure during the initial light compression of the article, during which a considerable portion of the contraction of the powder takes place. This effect may be varied in a number of ways to suit the article being produced; the rubber may be of a harder or softer type at certain points; its thickness may be varied or it may be free to move on the metal surface under it or on the contrary may be attached to it by adhesion accomplished during vulcanization or by cementing after vulcanization. Attachment may be accomplished by interlocking grooves instead of by adhesion if desired. At the same time when the high final pressure is exerted this greater resistance of the elastic material to flowing at any point is small in proportion to the great pressure exerted and, therefore, the final pressure which completes the formation of the mass into a self-sustaining shape is exerted substantially uniformly so that all portions of the mass are compressed substantially equally. The comparatively light initial pressure produces the greater part of the contraction and determines the approximate direction of the releasing movement of the mold walls. Therefore, by combining unequal movement due to initial pressure with substantially equal movement due to final pressure, uniformly pressed articles are formed while obtaining a releasing movement of the mold walls that avoids rupturing the article.

What I claim is:

1. The method of compressing granular or powdery material which consists in forming a body of the material having approximately the desired final shape, exerting initial unequal pressures on different portions of the body pressing it into more exactly the desired shape, and then completing the compression by exerting final pressure substantially equally upon all surfaces of the body.

2. A method which consists in forming a cavity of predetermined shape surrounded by readily deformable elastic material having sufficient strength to substantially maintain its shape during the filling operation, filling granular or powdery material into the cavity, compressing the material in the cavity by hydrostatic pressure exerted through said elastic walls, and making the final pressure sufficiently great so that the resistance of the walls is proportionately very small and the final pressure is exerted as substantially uniform hydrostatic pressure on the surface of the powder.

3. The method of compressing granular or powdery material which comprises filling the material into an elongated cavity open at one end and otherwise surrounded by self-sustaining deformable material, closing the open end, and compressing the powder into a self-sustaining body by applying to the deformable material a compressing force high in proportion to the resistance of the deformable material to deformation, and thereby forcing said deformable material to flow against the material within the cavity.

4. A press for molding ceramic materials and the like comprising a mold retainer open at one side, a solid mold within the retainer, the mold being of material that is self-sustaining during normal filling operations and that has flow characteristics under pressure, and the mold having therein an elongated cavity open at one end through the side of the mold towards the open side of the retainer, means movable relative to the retainer for closing said open side of the retainer and the open end of the mold cavity, and means to exert compression upon the material of the mold and cause it to flow against material in the cavity.

5. A mold having walls of rubber or the like sufficiently thick to be self-sustaining and having a cavity therein larger than the article to be formed and of non-spherical shape, means to introduce material into the cavity, means to close the cavity, and means to exert on the exterior of the rubber walls of the closed mold sufficient pressure to make said rubber walls transmit the pressure substantially like a liquid, a portion of said wall being more resistant to deformation than other portions of said mold wall, said more resistant portion being arranged to provide initial compression of the article along lines where the initial release must be greatest in order that this release movement may be approximately perpendicular to the contacted surface.

6. A mold having walls of rubber or the like sufficiently thick to be self-sustaining and having a cavity therein larger than the article to be formed and having a longitudinal axis, means to introduce material into the cavity, means to close the filled cavity, and means to exert on the exterior of the rubber walls of the closed mold sufficient pressure to make said rubber walls transmit the pressure substantially like a liquid, said mold being provided at the end of said longitudinal axis with a wall portion more resistant to deformation than other portions of the wall, whereby initial compression is exerted chiefly by other portions of the wall.

7. A press for molding ceramic materials and the like comprising a mold retainer open at one side, a solid mold within the retainer, the mold being of material that is self-sustaining during normal filling operations and that has flow characteristics under pressure, and the mold having therein an elongated cavity open at one end through the side of the mold towards the open side of the retainer, means movable relative to the retainer for closing said open side of the retainer and the open end of the mold cavity, means to exert compression upon the material of the mold and cause it to flow against material in the cavity, and means to reduce pressure on the mold material to less than atmospheric.

8. Molding apparatus comprising a mold having a flexible wall for its mold cavity, means for filling powdered or granular material into the mold cavity, means to exert hydrostatic pressure against the exterior of said flexible wall, and resilient means secured to the exterior of said wall for returning said wall to its original position after pressure is released.

9. Apparatus in accordance with claim 8 and comprising resilient means controlling the initial movement of said wall and rendering its initial compressing movement unequal, said resilient means being of such little strength proportionately to the hydrostatic pressure that the final compression exerted by said flexible wall is substantially uniform throughout.

10. Molding apparatus comprising a mold having a flexible wall for its mold cavity, means for filling granular or powdered material into the mold cavity, means to exert hydrostatic pressure against the exterior of said flexible wall and resilient means resisting the inward movement of said flexible wall at certain points more than at other points, said resilient means producing unequal initial compressing movement of said flexible wall and being arranged to render such unequal initial movement greatest along lines where the initial release movement must be greatest in order that this release movement may be approximately perpendicular to the surface contacted by said wall.

11. A press for molding ceramic materials and the like comprising a mold retainer open at one side, a solid mold within the retainer, the mold being of material that is self-sustaining during normal filling operations and that has flow characteristics under pressure, and the mold having therein an elongated cavity open at one end and through the side of the mold towards the open side of the retainer, a rigid core extending longitudinally through said cavity, means movable relative to the retainer for closing said open side of the retainer and the open end of the mold cavity, and means to exert compression upon the material of the mold and cause it to flow against material in the cavity.

BENJAMIN A. JEFFERY.